Patented Mar. 9, 1937

2,073,493

UNITED STATES PATENT OFFICE 2,073,493

ENERGY TRANSMISSION

Henry Salvatori, Hollywood, Calif., assignor to Western Geophysical Company, Tulsa, Okla., a corporation of Delaware No Drawing. Application April 24, 1936, Serial No. 76,259

6 Claims. (181—0.5)

This invention pertains to a method of obtaining more efficient transfer of pressure waves from an explosive into a dense medium, and applies particularly to the field of seismic geophysical prospecting. This type of prospecting consists in detonating a charge of explosive to generate seismic waves, detecting and recording those waves that are reflected or refracted from underground structures, and interpreting the records to determine the positions and/or slopes of those structures. Specifically, this invention deals with the first step in this method, viz. that of generating seismic waves by the explosion of a charge of dynamite or similar material.

One object of my invention is to make it possible to transmit increased energy from an explosive charge into rock in which it is normally difficult to generate seismic waves. Other objects will become apparent as the description of my invention proceeds.

The customary method of generating seismic waves for reflection or refraction seismometry at present consists of drilling a relatively small hole —three to six inches in diameter—from the surface of the earth to the water table, or to a depth ranging from one hundred to three hundred feet if no water is found. The explosive charge is lowered to the bottom of this hole, and sufficient water is added (for tamping) to fill the hole for some distance above the charge. Both the use of water as tamping and the custom of drilling to the water table if economically possible have resulted from experimenting in the field to secure the best results. If the records obtained from the reflected or refracted seismic waves generated by the detonation of the explosive are too weak, more explosive is used. However, it has been found that if the hole terminates in certain formations (notably limestone, although some sandstones also give trouble) it is extremely difficult to generate the requisite seismic energy, even if very large charges are used.

One method of overcoming this difficulty when shooting in hard formations has been suggested. This is the method of enlarging the bottom of the hole by some means, preferably chemical, so that there is a much larger area of hole wall exposed to the explosive force. This is discussed at some length in Johnson Patent No. 2,028,286.

This invention applies to another and more advantageous method for increasing the seismic energy transmitted from the explosion to a dense formation. In the course of experiments made to determine the effect of the various factors which influence the transmission of energy from shot to formation, it was discovered that a previously neglected factor was highly important. This factor is the nature of the material between the explosive charge and the wall of the hole. It was found that by packing different materials around the same sized charges in holes of equal dimensions in the same dense formation, the transmitted energy would vary over a wide range. Certain materials exhibited superior qualities as packing material. Thus, it was found that by placing clay or shale around the charge, much more energy was transmitted from the same amount of explosive to a surrounding limestone formation than when water was used as a tamping material.

Since the conclusion of the above mentioned experiments, field work has shown that the use of a so-called "transmission medium" around an explosive charge in a hole in a dense formation gives very marked increase in the seismic energy transmitted into the formation when the charge is detonated. The precise physical explanation for this phenomenon is not known at present. A number of possible reasons have been advanced, but until more thorough analysis of the exceedingly complicated factors entering the problem has been made, it is not deemed advisable to advance these theories. The fact remains that three materials, viz. shale, clay and water-permeated-sand, have been found valuable as media which will give markedly increased seismic wave energy in a dense formation per pound of explosive over that obtained without their use. Instead of water-permeated-sand, oil sand, asphalt-permeated-sand, and other liquid-permeated sands can be used. Other media such as water, loose sand, limestone, etc., are definitely not in this class and are not effective.

The transmission medium normally fills the bottom of the hole, except for the charge. There are a number of ways in which the transmission medium can be placed about the charge. Two methods which have been found successful are:

(1) To pack the material forming the transmission medium into the hole, form with a loading pole or similar means a hole for the explosive charge, load the charge into the hole thus formed, tamp down more material over the charge, and detonate the charge.

(2) To pack the material and explosive into a container, so that the explosive charge is surrounded by transmission medium, lower the container to the bottom of the hole, and detonate the charge.

The seismic waves thus generated are received (after penetrating to underlying formations), amplified and recorded in accordance with the usual practice.

It has been found that large amounts of transmission medium are preferred. Thus my invention can be used to advantage in connection with a shot hole having an enlarged cavity at its base as described in Johnson Patent No. 2,028,286.

Of course, if the dense formation extends to the surface, all that is necessary is to heap the transmission medium on the surface, bury the explosive in the heap, and detonate it there. Other methods will be apparent to those skilled in this art.

While this invention has been described in terms of certain specific embodiments it is not limited thereby but only to the scope of the appended claims which should be construed as broadly as the prior art will permit.

I claim:

1. A method of increasing the energy transmitted from an explosive charge to a dense neighboring formation such as limestone which comprises interposing between said explosive charge and said neighboring formation a layer of a less dense, plastic energy-transmission-medium selected from the group consisting of clay, limestone and liquid-permeated-sand, and then detonating said explosive charge, the characteristics of said energy-transmission-medium being such that the overall efficiency of transfer of seismic energy from said explosive charge to said neighboring formation is greater than that of direct transfer from said explosive charge to said neighboring formation.

2. A method of increasing the energy transmitted from an explosive charge to a surrounding dense formation belonging to the group consisting of limestone and sandstone which comprises placing between the explosive charge and said dense formation a layer of an energy-transmission-medium selected from the group consisting of shale, clay and liquid-permeated-sand.

3. A method of increasing the energy transmitted from an explosive charge to a surrounding bed of limestone which comprises placing between the explosive charge and said bed of limestone a layer of shale and then detonating said explosive charge.

4. In seismic geophysical prospecting the steps which comprise drilling a shot hole into a hard, dense formation such as limestone, placing a less dense, plastic energy-transmission-medium and an explosive charge in said shot hole, said energy-transmission-medium being interposed between said explosive charge and the walls of said shot hole, and detonating said explosive charge, said energy-transmission-medium being adapted to improve the efficiency of energy transfer from said explosive charge to the walls of said shot hole.

5. Steps according to claim 4 in which said energy-transmission-medium is selected from the group consisting of shale, clay and water-permeated-sand.

6. In seismic geophysical prospecting, a method of improving the energy transmission from an explosive charge to a surrounding dense formation belonging to the group consisting of limestone and sandstone which comprises placing between the explosive charge and said dense formation a layer of a less dense, plastic energy-transmission-medium selected from the group consisting of shale, clay and liquid-permeated-sand.

HENRY SALVATORI.